(12) United States Patent
Takizawa et al.

(10) Patent No.: US 6,967,232 B2
(45) Date of Patent: Nov. 22, 2005

(54) HIGH-MOLECULAR GELLING AGENT PRECURSOR FOR ELECTROLYTE

(75) Inventors: Minoru Takizawa, Tokyo (JP); Seiji Doi, Tokyo (JP); Chiaki Iwakura, Osaka (JP); Hiroshi Inoue, Osaka (JP); Naoji Furukawa, Kyoto (JP); Shinji Nohara, Osaka (JP); Yoshifumi Sugito, Tokyo (JP); Naomi Oguma, Tokyo (JP); Sachio Yoshikawa, Tokyo (JP); Michiei Nakamura, Tokyo (JP)

(73) Assignee: Dainichiseika Color & Chemicals Mfg., Co., Ltd., Tokyo (JP)

( * ) Notice: Subject to any disclaimer, the term of this patent is extended or adjusted under 35 U.S.C. 154(b) by 187 days.

(21) Appl. No.: 10/260,463

(22) Filed: Oct. 1, 2002

(65) Prior Publication Data

US 2003/0124430 A1 Jul. 3, 2003

(30) Foreign Application Priority Data

Oct. 4, 2001 (JP) .................................... 2001-308268

(51) Int. Cl.⁷ ................................................ C08F 12/30
(52) U.S. Cl. .................. 526/286; 526/319; 526/291; 526/292.5; 526/317.1; 526/340; 526/351; 526/352; 526/348.1
(58) Field of Search ........................ 526/319, 291, 526/292.95, 317.1, 340, 286, 348.1, 351, 352

(56) References Cited

U.S. PATENT DOCUMENTS 4,794,152 A  * 12/1988  Kobashi et al. ............. 526/273
5,543,045 A     8/1996  Fukutomi et al.
5,770,631 A     6/1998  Fukutomi et al.
6,133,193 A  * 10/2000  Kajikawa et al. ........... 502/402
6,465,595 B1 * 10/2002  Takizawa et al. ......... 526/317.1
6,484,887 B1   11/2002  Fukutomi et al.

OTHER PUBLICATIONS

Chiaki Iwakura, et al., Nickel/Metal Hydride Cells Using An Alkaline Polymer Gel Electrolyte Based on Potassium Salt of Crosslinked Poly(Acrylic Acid), Electrochemistry, The Electrochemical Society of Japan, vol. 69, No. 9, 2001, pp. 659–663.

Chiki Iwakura, et al., "Preparation and Characterization of Polymer Gel Electrolytes for Use in Nickel–Metal Hydride Battery", Proceedings of The 4th Japan–Korea Joint Seminar on Advanced Batteries, Jun. 15–16, 2001, pp. 14–20.

Chiaki Iwakura, et al., "The Possible Use of Polymer Gel Electrolytes in Nickel/Metal Hydride Battery", Solid State Ionics, Diffusion & Reactions, vol. 148, Nos. 3 & 4, Jun. 11, 2002, pp. 487–492.

* cited by examiner

*Primary Examiner*—William K. Cheung
(74) *Attorney, Agent, or Firm*—Oblon, Spivak. McClelland, Maier & Neustadt, P.C.

(57) ABSTRACT

A high-molecular gelling agent precursor for an electrolyte comprises a copolymer formed of (A) a hydrophobic monomer having a hydrophobic group, which forms a carboxyl group upon saponification, and (B) a hydrophobic polyfunctional monomer. The saponification product of the copolymer has property to gel the electrolyte. A high-molecular gelling agent for the electrolyte is produced by saponifying the precursor with a saponifying agent selected from the group consisting of acids and alkalis while using a reaction medium selected from the group consisting of water and hydrophobic organic solvents.

25 Claims, No Drawings

HIGH-MOLECULAR GELLING AGENT PRECURSOR FOR ELECTROLYTE

BACKGROUND OF THE INVENTION a) Field of the Invention

This invention relates to a high-molecular gelling agent precursor for an electrolyte, a process for its production and a high molecular gelling agent, and specifically to a high-molecular gelling agent for an electrolyte, said high-molecular gelling agent being useful as diaphragms in a cell.

b) Description of the Related Art

Conventionally, an electrolyte for an alkali cell is in a liquid form and is stored in a case. To store the electrolyte safely over an extended period of time, it is necessary to build the case into a strong construction. As a consequence, it has been difficult to form the cell into a thin structure.

As a diaphragm for use in a cell making use of a high-concentration alkaline electrolyte, a woven fabric or nonwoven fabric is now subjected to hydrophilizing treatment by sulfonation to impart compatibility with and capillary action to the electrolyte such that the electrolyte is retained in the woven fabric or nonwoven fabric. Under elevated temperatures or after an elapse of an extended period of time, however, hydrophilic groups on surfaces of the diaphragm which is composed of the woven fabric or nonwoven fabric subjected to hydrophilizing treatment are caused to decompose or separate so that the woven fabric or nonwoven fabric becomes hydrophobic locally. Water-repellant property is, therefore, produced, leading to an uneven distribution of the electrolyte in the diaphragm. This has become a cause of a deterioration in the performance as a secondary cell.

A method has been proposed in recent years. According to this method, an absorbent polymer is caused to absorb an electrolyte to form a swollen gel such that the electrolyte is solidified. This solidification can prevent leakage of the electrolyte and hence, can improve the safety of a cell. Moreover, the cell is provided with improved long-term storability owing to the solidification of the electrolyte by the gel-like material.

Such conventional absorbent polymers contain carboxyl groups, sulfone groups, ether groups or the like as hydrophilic groups, and selectively use hydrophilic polyfunctional monomers as crosslinking agents.

In each of these absorbent polymers, its crosslinks are formed of ester bonds, amide bonds, urethane bonds or the like. In a high-concentration alkaline solution as an electrolyte, these bonds are hydrolyzed through a saponification reaction. From the viewpoint of durability, such absorbent polymers are hence hardly usable over an extended period of time or under elevated temperatures within cells which make use of an alkaline electrolyte.

As a typical crosslinking agent (polyfunctional monomer) capable of affording a polymer which retains durability in an aqueous alkaline solution, divinylbenzene can be mentioned. However, divinylbenzene cannot be homogeneously copolymerized with a hydrophilic monomer because of its hydrophobic property. For example, a copolymer between acrylic acid, a hydrophilic monomer, and divinylbenzene, a hydrophobic polyfunctional monomer, can be obtained by bulk polymerization which does not use any solvent. However, no temperature control is feasible during polymerization, thereby making it impossible to copolymerize acrylic acid and divinylbenzene homogeneously at a practical level.

For the reasons described above, there is currently no stable supply of a high-molecular gelling agent for an electrolyte, said high-molecular gelling agent being capable of efficiently gelling and solidifying a high-concentration alkaline solution as an electrolyte and of remaining free of decomposition even when exposed to relatively high temperatures over an extended period of time.

SUMMARY OF THE INVENTION

An object of the present invention is, therefore, to provide by a simple process a high-molecular gelling agent for an electrolyte, which can easily gel and solidify a high-concentration, aqueous alkaline solution and remains free of decomposition even when exposed in a high-concentration alkaline state to relatively high temperatures over an extended period of time.

Another object of the present invention is to provide a high-molecular gelling agent, which can be readily formed into a film and can function as a cell diaphragm stable even in a high-concentration alkaline electrolyte.

The above-described objects can be achieved by the present invention to be described hereinafter. Described specifically, the present invention provides a high-molecular gelling agent precursor for an electrolyte, comprising:

a copolymer formed of (A) a hydrophobic monomer having a hydrophobic group, which forms a carboxyl group upon saponification, and (B) a hydrophobic polyfunctional monomer, a saponification product of said copolymer having property to gel said electrolyte.

Preferably, the hydrophobic group, which forms a carboxyl group upon saponification, may be an alkyloxycarbonyl group having 1 to 18 carbon atoms; a copolymerization ratio of the hydrophobic polyfunctional monomer (B) to the hydrophobic monomer (A) may be from 0.01:100 to 10:100 by weight; the hydrophobic polyfunctional monomer (B) may be at least one monomer selected from the group consisting of divinylaryl compounds and divinylfluoroalkane compounds; the copolymer may comprise, as monomer units, methyl acrylate units, divinylbenzene units and styrenesulfonic acid units; copolymerization of the hydrophobic monomer (A) and the hydrophobic polyfunctional monomer (B) may be conducted in an aqueous medium; and the precursor may be a copolymer in a form of a water dispersion system in which the copolymer has particle sizes in a range of from 0.1 to 100 $\mu$m.

The present invention also provides a process for producing a high-molecular gelling agent for an electrolyte, which comprises saponifying any one of the above-described precursors with a saponifying agent selected from the group consisting of acids and alkalis while using a reaction medium selected from the group consisting of water and hydrophobic organic solvents, and also a high-molecular gelling agent for an electrolyte, which is obtained by the process. Preferably, the precursor may be supported on an alkali-resistant backing; the backing may be selected from the group consisting of nonwoven and woven fabrics, and porous films, each of which fabrics is made of fibers of at least one resin selected from polypropylene and polyethylene; the nonwoven and woven fabrics may each have a basis weight of from 10 to 300 g/m$^2$, especially from 20 to 100 g/m$^2$ and the fibers may have a fineness of from 1 to 10 $\mu$m in diameter; the precursor may be coated at a rate of from 2.5 to 20 g/m$^2$ in terms of solid on a nonwoven or woven fabric made of fibers of at least one resin selected from polypropylene and polyethylene, or porous films; and the backing may be a nonwoven fabric made of fibers of polypropylene which may comprise 0.1 to 5 wt. % of sulfone groups.

According to the present invention, a homogeneous copolymer formed of the monomer (A) and the monomer (B) can be readily produced because the monomer (A) and the monomer (B) are both hydrophobic. Since the copolymer is hydrophobic, it can be firmly supported on a backing such as a woven fabric or nonwoven fabric made of polypropylene or like fibers which are hydrophobic. By saponifying the copolymer in a state supported on the backing, the monomer (A) units are readily saponified into carboxyl-containing units so that the copolymer can absorb, gel and solidify a high-concentration alkaline electrolyte. Moreover, the copolymer remains stable without decomposition even when it is exposed to relatively high temperatures over an extended period of time in the high-concentration alkaline solution because the copolymer does not contain hydrolyzable bonds.

The process according to the present invention can easily produce a high-molecular gelling agent for an electrolyte, which can readily gel and solidify a high-concentration aqueous alkaline solution and can remain free of decomposition even when exposed in a high-concentration alkaline state to relatively high temperatures over an extended period of time.

Further, the precursor according to the present invention can provide a high-molecular gelling agent for an electrolyte, which can be readily formed into a film, is stable even in a high-concentration alkaline electrolyte and also has a function as a cell diaphragm.

DETAILED DESCRIPTION OF THE INVENTION AND PREFERRED EMBODIMENTS

The present invention will next be described in further detail on the basis of preferred embodiments.

Each high-molecular gelling agent precursor according to the present invention is a copolymer formed of (A) a hydrophobic monomer having a hydrophobic group, which forms a carboxyl group upon saponification, and (B) a hydrophobic polyfunctional monomer. Upon saponification in a usual manner, the copolymer forms a number of carboxyl groups and therefore, can absorb a high-concentration alkaline electrolyte and can gel and solidify the electrolyte.

The monomer (A) is a hydrophobic monomer having a hydrophobic group which forms a carboxyl group upon saponification. The monomer (A) is, for example, an alkyl acrylate, an alkyl methacrylate, an alkyl itaconate, an alkyl fumarate, and/or an alkyl maleate. These alkyl groups may each contain 1 to 18 carbon atoms, with alkyl groups each having 3 or less carbon atoms being preferred. More preferred are the methyl esters, with methyl acrylate being particularly preferred.

The monomer (B) is a hydrophobic monomer containing two or more addition-polymerizable double bonds. Preferred are those containing no hydrolyzable groups, for example, divinylaryl compounds such as divinylbenzene and divinylnaphthalene, and divinylfluoroalkane compounds such as 1,4-divinyloctafluorobutane, 1,6-divinyldodecafluorohexane and 1,8-divinylhexadecafluorooctane. Poly(meth)acrylic esters of polyhydric alcohols, such as the di(meth)acrylic ester of polyethylene glycol and the di(meth)acrylic ester of propylene glycol, may also be used in combination, although from the standpoint of durability of the resulting copolymer, a divinylaryl compound and/or a divinylfluoroalkane compound such as divinyloctafluorobutane is preferred, with divinylbenzene being particularly preferred.

The copolymerization ratio of the monomer (B) to the monomer (A) may preferably be from 0.01:100 to 10:100 by weight, with 0.05:100 to 10:100 by weight being more preferred. Use of the monomer (B) in an unduly small proportion results in a copolymer the crosslink density of which is so low that even after saponification, the copolymer tends to dissolve into an alkaline electrolyte. Use of the monomer (B) in an excessively high proportion, on the other hand, leads to a reduction in the absorbency of an alkaline electrolyte after saponification.

As the copolymer for use in the present invention, a hydrophilic monomer (C) can be additionally copolymerized in a proportion of from 0.5 to 15 parts by weight per 100 parts by weight of the sum of the monomer (A) and the monomer (B). Examples of the monomer (C) can include hydrophilic monomers such as (meth)acrylic acid, itaconic acid, fumaric acid, styrenesulfonic acid, hydroxyethyl (meth)acrylate, vinylpyridine, and polyethylene glycols having acryloyl groups at ends thereof and alkyl ethers thereof. In particular, styrenesulfonic acid is useful as a self-emulsifier in soap-free emulsion polymerization, and copolymerized styrenesulfonic acid units have an important function such that their sulfone groups act as a scavenger for a metal leached out of electrodes and prevent a reduction in the electrolyte absorbency of a saponified product of the copolymer. Use of the hydrophilic monomer in an excessively large proportion results in formation of a hydrophilic homopolymer of the monomer (C), thereby making it difficult to evenly introduce the hydrophobic monomer (B) such as divinylbenzene into the resulting copolymer.

As the copolymer for use in the present invention, a further hydrophobic monomer can be additionally copolymerized in a proportion of from 0.5 to 50 parts by weight per 100 parts by weight of the sum of the monomer (A) and the monomer (B). Preferred examples of the further hydrophobic monomer can include styrene, vinyl acetate, acrylonitrile, and methacrylonitrile. Use of the further hydrophobic monomer in an excessively large proportion eventually results in a high molecular gelling agent for an electrolyte, said gelling agent being equipped with reduced absorbency for the electrolyte.

Copolymerization of the above-described monomers can be performed by emulsion polymerization, soap-free polymerization or dispersion polymerization with a polymerization initiator dissolved in an aqueous medium or by suspension polymerization (pearl polymerization) or by bead polymerization with a polymerization initiator dissolved in the monomers, although the copolymerization is not impossible even by bulk polymerization. Upon copolymerization, a surfactant, polyvinyl alcohol, polyvinylpyrrolidone or the like may also be used. Emulsion polymerization is preferred especially to obtain the copolymer as a finely-divided dispersion.

Examples of water-soluble polymerization initiators can include persulfates, for example, potassium persulfate, ammonium persulfate; hydrogen peroxide; and water-soluble azobis compounds, for example, 2,2'-azobis(2-methylpropionamidine) dihydrochloride, 2,2'-azobis(2-(1-(2-hydroxyethyl)-2-imidazolin-2-yl)propane) dihydrochloride and 2,2'-azobis(cyanovaleric acid). Among monomer-soluble initiators, typical examples can include azoisobutyronitrile as an azobis initiator; and benzoyl peroxide, t-butyl-hydroperoxide and di-t-butylperoxide as peroxide initiators.

A dispersion, which may also be called "emulsion" or "latex", of the resultant copolymer may preferably have a solid concentration of from about 1 to 50 wt. %. To provide the thus-obtained copolymer with improved impregnating ability to woven fabrics and nonwoven fabrics, the particles of dispersed resin are also important. The dispersed resin may have particle sizes preferably in a range of from 0.1 to 100 µm, especially up to 50 µm, more preferably up to 2 µm.

The copolymer obtained as described above does not have much water absorbency or liquid absorbency by itself. When the copolymer is saponified, however, a number of carboxyl groups are forms so that the copolymer can act as a gelling agent for a strongly alkaline electrolyte. In the present invention, the copolymer may be saponified after separating it from a polymerization mixture, shaping the same into a desired form, and then having the thus-shaped copolymer supported on a suitable backing such as a woven fabric or nonwoven fabric. As a further alternative, the copolymer may be saponified after having the copolymerization mixture supported as is on a suitable backing such as a woven fabric or nonwoven fabric without separation of the copolymer. Whichever saponification procedure is used, a hydrolysis-resistant binder or the like can also be added to facilitate the shaping of the copolymer and also to assure firm support of the copolymer on the backing.

Examples of the hydrolysis-resistant binder can include natural rubber; synthetic rubbers such as chloroprene rubber, isoprene rubber, butyl rubber, styrene-butadiene copolymer, acrylonitrile-butadiene copolymer, and their hydrogenation products; ethylene-vinyl acetate copolymer and its saponification product; and polyethylene, polypropylene, polystyrene, polyisobutylene, butyral resins and silicone resins. The above-described copolymers as binders may each have any one of bonding types consisting of the random bonding type, the A-B-A block bonding type, the multiblock bonding type which may contain A-B blocks mixed therein, and the graft bonding type. Preferred examples can include butyl rubber, polyethylene, polypropylene, polystyrene, polyisobutylene, and synthetic rubbers and hydrogenated products thereof. Preferably, the above-described binder may also be in the form of a water dispersion (emulsion or latex).

As a substance which as a tackifier, exhibits tackiness under heat despite its low molecular weight, rosin, a petroleum resin or the like can also be added. Further, dicyclohexyl phthalate, dioctyl phthalate, dibutyl phthalate, dibutyl adipate, naphthene oil or the like can also be added as a plasticizer. A porous film can be formed by immersing a pre-saponification copolymer film in a poor solvent upon its plasticization or film casting such that the plasticizer is removed from the film.

Such additives may be used or may be unused. When they are used, their total content may preferably in a range of from 1 to 100 parts by weight per 100 parts by weight of the copolymer before saponification or the copolymer after saponification. If they are added in an excessively large total proportion, the resulting high molecular gelling agent for a cell electrolyte may be provided with lowered performance.

Preferred examples of the backing for use in the present invention can include woven and/or nonwoven fabrics made of polypropylene and/or polyethylene fibers and porous films, all of which are excellent in alkali resistance. These backings may have a thickness preferably in a range of from 5 to 500 µm. more preferably in a range of from 20 to 300 µm. A thickness smaller than 5 µm tends to result in serving as an incomplete diaphragm when employed as a diaphragm in a cell, while a thickness greater than 500 µm cannot meet the object that a thin cell be provided. The basis weight of the woven fabric or nonwoven fabric may preferably in a range of from 10 to 300 g/cm². A basis weight smaller than 10 g/m² leads to a failure in acting as a diaphragm, while a basis weight greater than 300 g/m² does not permit easy penetration of the copolymer dispersion into the backing. The fibers which make up the nonwoven fabric or woven fabric may preferably have a fineness of from 1 to 10 µm.

These backings may be or may not be subjected to hydrophilization treatment, although it is generally preferred to have them subjected to hydrophilization treatment. Illustrative hydrophilization methods can include sulfonation treatment, corona discharge treatment, coating with a coating formulation of a resin containing carboxyl groups or hydroxyl groups, and partial interweaving of hydrophilic fibers in a woven fabric or nonwoven fabric. A representative example is sulfonation treatment. Sulfonation treatment may desirably applied to such an extent that the woven fabric or nonwoven fabric contains 0.1 to 5 wt. % of sulfone groups. If the content of sulfone groups in the woven fabric or nonwoven fabric is smaller than 0.1 wt. %, the woven fabric or nonwoven fabric has weak hydrophilicity so that the water dispersion of the copolymer cannot exhibit sufficient impregnating ability. If the content of sulfone groups in the woven fabric or nonwoven fabric is greater than 5 wt. %, on the other hand, substantial sulfone groups tend to separate off from the woven fabric or nonwoven fabric, leading to a reduction in the strength of the woven fabric or nonwoven fabric. It is also important for the woven fabric or nonwoven fabric to permit therethrough permeation of gas (such as oxygen and the like) occurring in a cell. In addition to the impregnability with the copolymer, it is also important for the woven fabric or nonwoven fabric to make some hydrophobic parts remain therein for this purpose.

In the present invention, the copolymer may be saponified by itself, after its shaping into the form of a film or the like, or in a form supported on backing. It is, however, preferred to conduct the saponification of the copolymer in a form impregnating a backing, especially a woven fabric or nonwoven fabric. For the impregnation of the woven fabric or nonwoven fabric with the copolymer, the mangle method is generally preferred as a coating method. As an alternative, a coating method such as spray coating, knife coating, flow coating or gravure coating may also be used. The amount of the copolymer impregnating the woven fabric or nonwoven fabric may range from 2.5 to 20 g/m² in terms of copolymer solid, or may account for 20 to 250 vol. %, more preferably for 80 to 120 vol. % based on interstices in the woven fabric or nonwoven fabric.

The saponification of the copolymer can be conducted in methanol, ethanol, an aqueous solvent, or a mixed solvent thereof. Catalysts for use in saponification include acids and alkalis. Either an acid or an alkali can be used in the above-described saponification. For acid saponification, sulfuric acid, hydrochloric acid or the like can be used. For alkali saponification, on the other hand, lithium hydroxide, sodium hydroxide, potassium hydroxide or the like can be used. Carboxyl groups which are formed by the saponification may be converted into salts with an alkali metal such as K, Na or Li, or may be neutralized with an alkaline electrolyte in a cell.

The present invention will hereinafter be described more specifically on the basis of Examples and Comparative Examples, in which the designations of "part" or "parts" and "%" are each on a weight basis unless otherwise specifically indicated.

EXAMPLE 1

Synthesis of Copolymer A

Methyl methacrylate (74 parts), styrene (10.6 parts), hydroxyethyl methacrylate (6.3 parts), sodium styrenesulfonate (6.4 parts), divinylbenzene (0.8 part, purity: 55%), potassium persulfate (1.2 parts) and deionized water (500 parts) were charged in a reaction vessel, and were polymerized at 70° C. for 8 hours under a nitrogen gas atmosphere. A copolymer in the resulting polymerization mixture had particle sizes in a range of from 200 to 300 nm.

EXAMPLE 2

Synthesis of Copolymer B

Methyl methacrylate (70 parts), sodium styrenesulfonate (3 parts), divinylbenzene (3.66 parts, purity: 55%), potassium persulfate (1.5 parts) and deionized water (550 parts) were charged in a reaction vessel, and were polymerized at 70° C. for 8 hours under a nitrogen gas atmosphere. A copolymer in the resulting polymerization mixture had particle sizes in a range of from 300 to 500 nm.

EXAMPLE 3

Synthesis of Copolymer C

Polymerization was conducted in a similar manner as in Example 2 except that sodium styrenesulfonate was replaced by potassium methacrylate. A copolymer in the resulting polymerization mixture had particle sizes in a range of from 1,000 to 3,000 nm.

EXAMPLE 4

Synthesis of Copolymer D

Methyl methacrylate (41.7 parts), hydroxyethyl methacrylate (3.1 parts), divinylbenzene (1.2 parts, purity: 55%), azobisisobutyronitrile (0.9 part), polyvinyl alcohol (4.1 parts), xylene (50 parts) and deionized water (600 parts) were charged in a reaction vessel, and were polymerized at 75° C. for 8 hours under a nitrogen gas atmosphere. The polymerization mixture was filtered through an approximately 200-mesh net made of polyvilylidene chloride. A solid matter was thoroughly washed with water to remove polyvinyl alcohol, and was then dried at 80° C. The thus-obtained copolymer had particle sizes in a range of from 5,000 to 10,000 nm.

COMPARATIVE EXAMPLE 1

Synthesis of Copolymer E

Polymerization was conducted in a similar manner as in Example 1 except that divinylbenzene was not used.

COMPARATIVE EXAMPLE 2

Synthesis of Copolymer F

Polymerization was conducted in a similar manner as in Example 1 except that divinylbenzene was replaced by triethylene glycol dimethacrylate (4.45 parts).

COMPARATIVE EXAMPLE 3

Synthesis of Copolymer G

Acrylic acid (99 parts), divinylbenzene (1 part, purity: 55%), methyl ethyl ketone (500 parts) and azobisisobutyronitrile (1 part) were charged in a flask and then heated to 80° C., at which polymerization was conducted. As a result, a dispersion of a gelled substance precipitated as a mass. The mass was washed with methanol and then dried.

<Testing Methods>

(1) Concentrated potassium hydroxide test (alkaline solution absorption rate (%))

A 45 wt. % aqueous solution of potassium hydroxide was prepared with its temperature heated to 80° C. A predetermined amount (M0) of Copolymer A was accurately weighed and then poured into the aqueous solution of potassium hydroxide. After the resulting mixture was allowed to stand for 5 days (during this period, saponification was completed), the mixture was chilled. The mixture was filtered through an approximately 200-mesh net made of polyvinylidene chloride, the weight of which was already known, to thoroughly drain the solution. The weight (M1) of the sample with the solution absorbed therein was measured. Its solution absorption rate was calculated in accordance with $[(M1-M0)/M0] \times 100$. Solution absorption rates of Copolymers B–G were also determined likewise. The results are shown in Table 1.

Each sample, which was dissolved or rendered into a colloidal form and passed through the net made of polyvinylidene chloride, is indicated by "–0%" for distinction. As this sample is unable to solidify an electrolyte, it was ranked "no good".

<Evaluation>

Those having an alkaline solution absorption rate of 50% or greater are usable as high molecular selling agents for cell electrolytes.

(2) Percent remainder

Each sample with the alkaline solution absorbed therein, which had been measured for the alkaline solution absorption rate (1), was washed with water to remove any excess aqueous solution of KOH. The sample was then dried to determine its weight (M2). The percent remainder of the sample is presented in accordance with the following formula:

$$\text{Percent remainder} = M2/M0 \times 100$$

The results are shown in Table 1.

<Evaluation>

A higher percent remainder indicates that upon copolymerization of the monomers, the crosslinking agent acted more effectively to make the resulting copolymer more insoluble in an aqueous alkaline solution. Described specifically, in Copolymers A to D in each of which divinylbenzene was used, divinylbenzene was evenly copolymerized so that their saponification products underwent less dissolution. In Copolymers E and F, the copolymerized triethylene glycol dimethacrylate units were hydrolyzed. In Copolymer G, divinylbenzene was not evenly copolymerized. A percent remainder of 10% or greater permits use as a high-molecular gelling agent for a cell electrolyte.

TABLE 1

|  |  | Copolymer | Alkaline solution absorption rate (%) | Percent remainder | Evaluation |
|---|---|---|---|---|---|
| Example | 1 | A | 2000 | 50 | Good |
|  | 2 | B | 1500 | 95 | Good |
|  | 3 | C | 1000 | 81 | Good |
|  | 4 | D | 1200 | 82 | Good |
| Comparative Example | 1 | E | –0 | 0 | Not good (no solution absorbency) |
|  | 2 | F | –0 | 0 | Not good (no solution absorbency) |
|  | 3 | G | 30 | 2 | Not good (no solution absorbency) |

APPLICATION EXAMPLE 1

A dispersion of Copolymer B was coated by the mangle method onto a sulfonation-treated, woven propylene fabric, (thickness: 130 µm, basis weight: 31 g/m$^2$), and the thus-coated woven fabric was dried to obtain a precursor-treated woven fabric. Solid coat weight was 5 g/m$^2$. The thus-coated woven fabric was placed in a solution which consisted of 15% of potassium hydroxide, 51% of methanol and 34% of water, and was then left over at 65° C. for 2 hours (during which saponification was completed). Subsequently, the woven fabric was taken out of the solution, washed thoroughly with methanol to remove excess potassium hydroxide, and then dried. The impregnating amount of the resin at that time was 7.5 g/m$^2$. This indicates that methyl acrylate units had been almost quantitatively saponified into potassium acrylate units and also that the coated resin had not separated from the woven fabric. The woven fabric with the saponified copolymer coated thereon was confirmed to quickly absorb water and a high-concentration solution of potassium hydroxide.

The electrical conductivity of the woven fabric was 0.239 S(Siemens)/cm when measured in a form with a 40% aqueous solution of potassium hydroxide absorbed therein (absorbed amount: 70 g/m$^2$). For the sake of comparison, a diaphragm obtained by causing the same woven polypropylene fabric to absorb an 40% aqueous solution of potassium hydroxide without impregnating the fabric with Copolymer B was measured for electrical conductivity. It was found to be 0.239 S(Siemens)/cm. This electrical conductivity was confirmed to be the same as the above-described result.

APPLICATION EXAMPLE 2

A dispersion of Copolymer B was coated by the mangle method onto a sulfonation-treated, nonwoven propylene fabric (thickness: 125 µm, basis weight: 62 g/m$^2$, specific gravity: 1.0) to give the various coat weights to be shown in Table 2, and the thus-coated samples of the nonwoven fabric were dried to obtain precursor-treated nonwoven fabric samples. Those resin-impregnated nonwoven fabric samples were placed in a solution which consisted of 15% of potassium hydroxide, 51% of methanol and 34% of water, and were then left over at 65° C. for 2 hours (during which saponification was completed). Subsequently, the nonwoven fabric samples were taken out of the solution, washed thoroughly with methanol and isopropyl alcohol to remove excess potassium hydroxide, and then dried at 80° C.

To investigate the absorbency of a saponified product alone of Copolymer B, a 10% solution (130 parts) of potassium hydroxide in methanol was mixed with the dispersion (100 parts) described in Example 2, followed by a reaction at 70° C. for 4 hours. The reaction product was collected by filtration through a polyvinylidene chloride net of approximately 200 mesh, and was then thoroughly washed with methanol. Subsequent to substitution of isopropyl alcohol for methanol, the reaction product was dried and coarsely ground into a 60-mesh pass powder. The powder was analyzed by infrared absorption spectroscopy. No remaining ester groups were found, so that completion of the saponification reaction was confirmed. The saponified product absorbed water 90 times as much as its own weight, and also a 45% aqueous solution of potassium hydroxide 15 times as much as its own weight.

Ranking method

The above-described samples of the nonwoven fabric, which had been impregnated with the various amounts of Copolymer B, were caused to absorb a 45 wt. % aqueous solution (specific gravity: 1.33) of potassium hydroxide as a cell electrolyte. Those samples were then measured for the absorbed amount of the alkaline solution, percent remainder and electrical conductivity. The results summarized in Table 2 were obtained. The measurements of percent remainder and electrical conductivity were performed by similar methods as in Application Example 1, while the absorbed amounts of the alkaline solution were each determined by pressing a sheet of filter paper against the corresponding nonwoven fabric with the electrolyte absorbed therein, allowing the filter paper to absorb the electrolyte to remove the electrolyte from the nonwoven fabric, and then measuring the amount of the alkaline solution absorbed per m$^2$ of the nonwoven fabric. Unless the percent remainder of an electrolyte is higher than 30%, there is a potential leakage problem of the electrolyte from a cell.

TABLE 2

| Impregnating amount of Copolymer B (g/m$^2$) | Absorbed amount of alkaline solution (g/m$^2$) | Percent remainder | Electrical conductivity (S/cm) | Overall ranking* |
|---|---|---|---|---|
| 0 | 0 | 30 | 0.78 | D |
| 2.5 | 27.5 | 82 | 0.70 | B |
| 5.0 | 55.0 | 100 | 0.58 | A to B |
| 10 | 110 | 100 | 0.44 | A |
| 15 | 165 | 100 | 0.26 | B |
| 20 | 220 | 100 | 0.18 | B |
| 25 | 275 | 100 | 0.01 | C |
| 30 | 330 | 100 | 0.0 | D |

*A: Excellent, B: Good, C: Fair, D: Poor

From Table 2, it is appreciated that a range of from 2.5 to 20 g/m$^2$ is preferred as the impregnating amount of a saponified product for a nonwoven fabric and also that impregnating amounts of the saponified product outside the above-described range results in treated nonwoven fabrics not suited as cell separators because an impregnating amount smaller than 2.5 g/m² involves a potential problem of electrolyte leakage while an impregnating amount greater than 20 g/m² leads to formation of an excessively large amount of the saponified product so that an electrolyte is consumed to lower the electrical conductivity. As a matter of fact, excellent cell performance was obtained when the above-treated nonwoven fabric, which was impregnated at 5 g/m² with the resin, was used as a separator in a nickel-hydrogen secondary cell.

REFERENTIAL EXAMPLE 1

A powder of the saponified product obtained in Application Example 2 was added into methanol/methyl ethyl ketone (1:1 by weight ratio) to a concentration of 10%, followed by dispersion on a paint shaker for 2 hours to prepare a dispersion (average particle size: 200 μm). An attempt was made to have a nonwoven fabric impregnated with the dispersion by the same procedure as in Application Example 2, but no even impregnation was feasible.

This application claims the priority of Japanese Patent Application 2001-308268 filed Oct. 4, 2001, which is incorporated herein by reference.

What is claimed is:

1. A high-molecular gelling agent precursor for an electrolyte, comprising:
    a copolymer formed of (A) a hydrophobic monomer having a hydrophobic group, which forms a carboxyl group upon saponification, and (B) at least one divinylfluoroallcane monomer,
    wherein a saponification product of said copolymer having property to gel said electrolyte.

2. A precursor according to claim 1, wherein said hydrophobic group, which forms a carboxyl group upon saponification, is an alkyloxycarbonyl group having 1 to 18 carbon atoms.

3. A precursor according to claim 1, wherein a copolymerization ratio of said hydrophobic polyfunctional monomer (B) to said divinylfluoroalkane monomer (A) is from 0.01:100 to 10:100 by weight.

4. A precursor according to claim 1, wherein said copolymer comprises, as monomer units, methyl acrylate units, divinylbenzene units and styrenesulfonic acid units.

5. A precursor according to claim 1, which is a copolymer in a form of a water dispersion system in which said copolymer has particle sizes in a range of from 0.1 to 100 μm.

6. A process for producing a precursor as defined in claim 1, which comprises conducting copolymerization of said hydrophobic monomer (A) and said divinyifluoroalkane monomer (B) in an aqueous medium.

7. A process for producing a high-molecular gelling agent for an electrolyte, which comprises saponifying a precursor as defined in claim 1 with a saponifying agent selected from the group consisting of acids and alkalis while using a reaction medium selected from the group consisting of water and hydrophobic organic solvents.

8. A process according to claim 7, wherein said precursor is supported on an alkali-resistant backing.

9. A process according to claim 8, wherein said backing is selected from the group consisting of nonwoven and woven fabrics, each of said fabrics being made of fibers of at least one resin selected from polypropylene and polyethylene, and porous films.

10. A process according to claim 9, wherein said nonwoven and woven fabrics each has a basis weight of from 10 to 300 g/m² and said fibers have a fineness of from 1 to 10 μm in diameter.

11. A process according to claim 9, wherein said precursor is coated at a rate of from 2.5 to 20 g/m² in terms of solid on a nonwoven or woven fabric made of fibers of at least one resin selected from polypropylene and polyethylene, or porous films.

12. A process according to claim 9, wherein said backing is a nonwoven fabric made of fibers of polypropylene which comprises 0.1 to 5 wt. % of sulfone groups.

13. A high-molecular gelling agent for electrolyte, said gelling agent having been obtained by a process according to claim 7.

14. A high-molecular gelling agent precursor for an electrolyte, comprising:
    a random copolymer comprising polymerized units of (A) at least one hydrophobic monomer having a hydrophobic group, which forms a carboxyl group upon saponification, (B) at least one hydrophobic polyfunctional monomer selected from the group consisting of a divinylaryl compound and a divinylfluoroalkane compound, and (C) at least one styrenesulfonic acid monomer,
    wherein a saponification product of said copolymer having property to gel said electrolyte.

15. A precursor according to claim 14, wherein said hydrophobic group is an alkyloxycarbonyl group having 1 to 18 carbon atoms.

16. A precursor according to claim 14, wherein the copolymer comprises copolymerized units of the hydrophobic polyfunctional monomer (B) and the hydrophobic monomer (A) in a ratio of from 0.01:100 to 10:100 by weight.

17. A precursor according to claim 14, wherein said copolymer comprises copolymerized units of methyl acrylate units, divinylbenzene units and styrenesulfonic acid units.

18. A dispersion comprising the precursor according to claim 14, and water, wherein the copolymer is present as particles dispersed in water, and the copolymer has a particle size in a range of from 0.1 to 100 μm.

19. A process for producing a precursor as defined in claim 14, which comprises
    copolymerizing the hydrophobic monomer (A), the hydrophobic polyfunctional monomer (B) and the styrene sulfonic acid monomer (C), in an aqueous medium.

20. A process for producing a high-molecular gelling agent for an electrolyte, which comprises
    saponifying a precursor as defined in claim 14 with at least one saponifying agent selected from the group consisting of an acid and an alkali,
    wherein the saponifying is carried out in a reaction medium selected from the group consisting of water, a hydrophobic organic solvent and mixtures thereof.

21. A process according to claim 20, wherein said precursor is supported on an alkali-resistant backing.

22. A process according to claim 21, wherein said backing is selected from the group consisting of nonwoven fabrics, woven fabrics and porous films, wherein each of said fabrics is made of fibers of at least one resin selected from the group consisting of polypropylene and polyethylene.

23. A process according to claim 22, comprising at least one of a nonwoven or woven fabric, each having a basis weight of from 10 to 300 g/m² and said fibers have a fineness of from 1 to 10 μm in diameter.

24. A process according to claim 22, wherein said precursor is coated at a rate of from 2.5 to 20 g/m² in terms of solid on a nonwoven or woven fabric made of fibers of at least one resin selected from the group consisting of polypropylene and polyethylene, or porous films.

25. A process according to claim 22, comprising a nonwoven fabric backing made of fibers of polypropylene which comprises 0.1 to 5 wt. % of sulfone groups.

* * * * *